US008634589B2

(12) United States Patent
Shimizu

(10) Patent No.: US 8,634,589 B2
(45) Date of Patent: Jan. 21, 2014

(54) INFORMATION PROCESSING APPARATUS AND METHOD FOR REGISTERING MOVING OBJECTS AS METADATA OF AN IMAGE

(75) Inventor: Tomoyuki Shimizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 12/760,138

(22) Filed: Apr. 14, 2010

(65) Prior Publication Data

US 2010/0290671 A1 Nov. 18, 2010

(30) Foreign Application Priority Data

May 13, 2009 (JP) .................. 2009-117046

(51) Int. Cl.
*G06K 9/00* (2006.01)
(52) U.S. Cl.
USPC .......................................... 382/103; 348/169
(58) Field of Classification Search
None
See application file for complete search history.

(56) References Cited

U.S. PATENT DOCUMENTS

| | | | |
|---|---|---|---|
| 6,405,132 B1 * | 6/2002 | Breed et al. .................. | 701/301 |
| 8,082,101 B2 * | 12/2011 | Stein et al. .................. | 701/301 |
| 2007/0173956 A1 * | 7/2007 | Koch et al. .................. | 700/6 |
| 2008/0088424 A1 * | 4/2008 | Imura et al. .................. | 340/436 |
| 2009/0234523 A1 * | 9/2009 | Nandedkar et al. .......... | 701/20 |
| 2010/0253593 A1 * | 10/2010 | Seder et al. .................. | 345/7 |
| 2010/0292886 A1 * | 11/2010 | Szczerba et al. ............. | 701/29 |

FOREIGN PATENT DOCUMENTS

| | | | | |
|---|---|---|---|---|
| JP | 2001-292411 | | 10/2001 | |
| JP | 2005-086759 | * | 3/2005 | ............. H04N 5/225 |

OTHER PUBLICATIONS

Oliver et al., "Multi-robot Path Planning by Predicting Structure in a Dynamic Environment," (2000), Institute for Software Research, Paper 537.*
Roth, Jörg. "Extracting line string features from GPS logs." Schriftenreihe der Georg-Simon-Ohm-Hochschule Nuernberg (2008).*
Viana, Windson, et al. "PhotoMap—automatic spatiotemporal annotation for mobile photos." Web and Wireless Geographical Information Systems. Springer Berlin Heidelberg, 2007. 187-201.*
Lin, Shang-Hung, Sun-Yuan Kung, and Long-Ji Lin. "Face recognition/detection by probabilistic decision-based neural network." Neural Networks, IEEE Transactions on 8.1 (1997): 114-132.*
Morris, Scott, Alan Morris, and Kobus Barnard. "Digital trail libraries." Proceedings of the 4th ACM/IEEE-CS joint conference on Digital libraries. ACM, 2004.*
"Facial Recognition" http://www.sony.co.jp/SonyInfo/technology/technology/theme/sface_01.htmlupdated Jan. 13, 2009 (Partial English Translation of) (Cited in the spec. [0002]).

* cited by examiner

*Primary Examiner* — Bhavesh Mehta
*Assistant Examiner* — Andrew Moyer
(74) *Attorney, Agent, or Firm* — Cowan, Liebowitz & Latman, P.C.

(57) ABSTRACT

An association degree evaluation unit acquires pieces of position information of an image sensing apparatus at respective times within an adjacent time range to an imaging time of a designated image of those sensed by the image sensing apparatus. Furthermore, the association degree evaluation unit acquires pieces of position information of a moving object at the respective times within the adjacent time range. Then, the association degree evaluation unit calculates a similarity between routes of the image sensing apparatus and moving object based on the acquired position information group, and decides a degree of association between the designated image and moving object based on the calculated similarity. An associating unit registers information indicating the degree of association in association with the designated image.

10 Claims, 8 Drawing Sheets

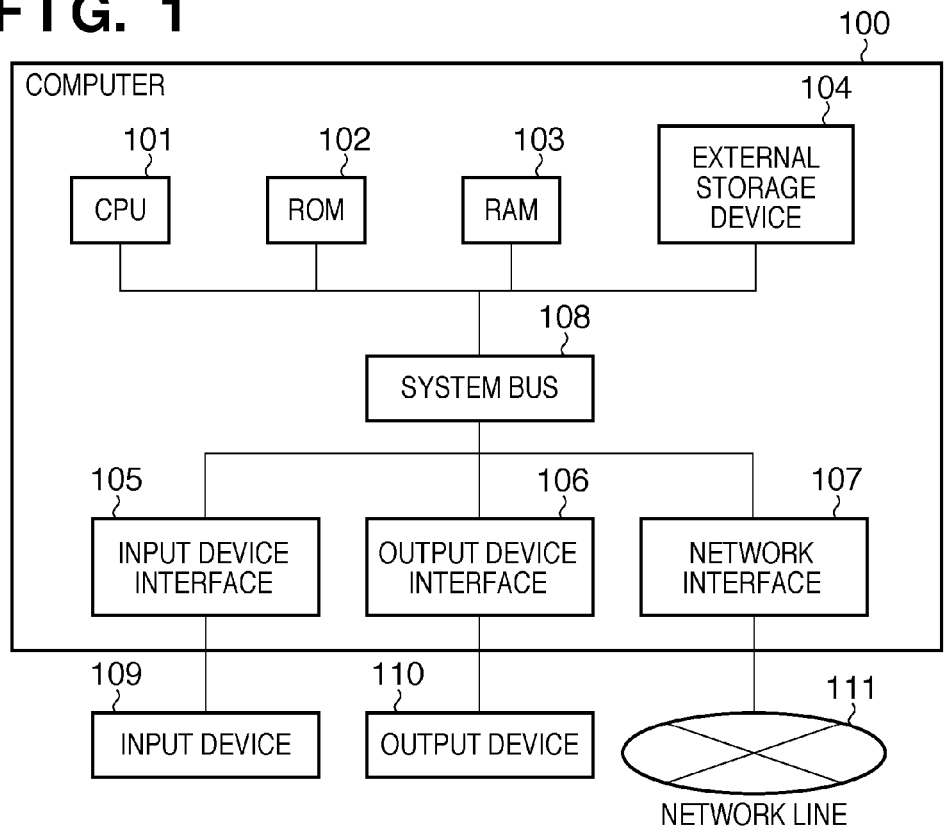
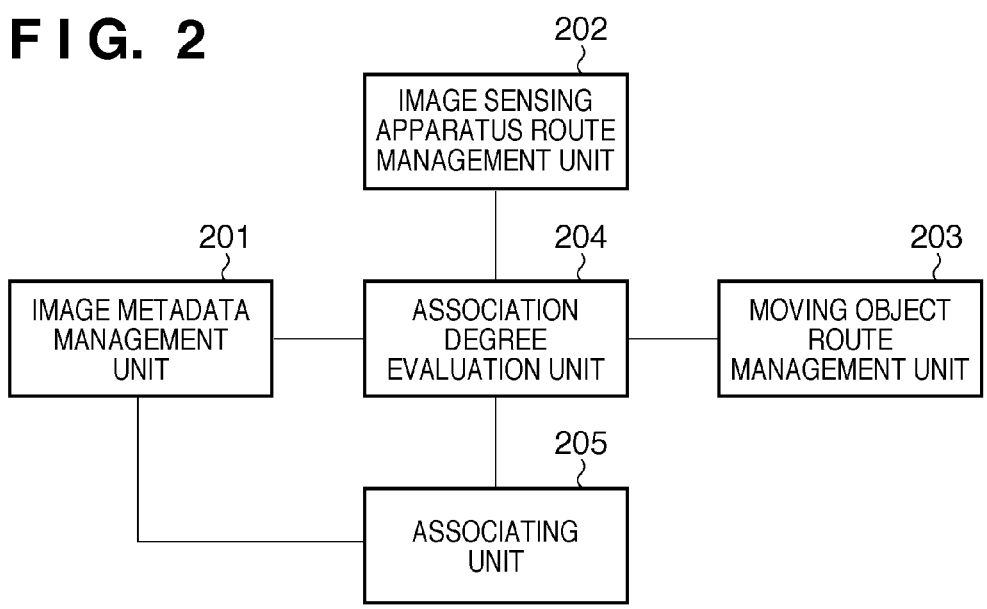

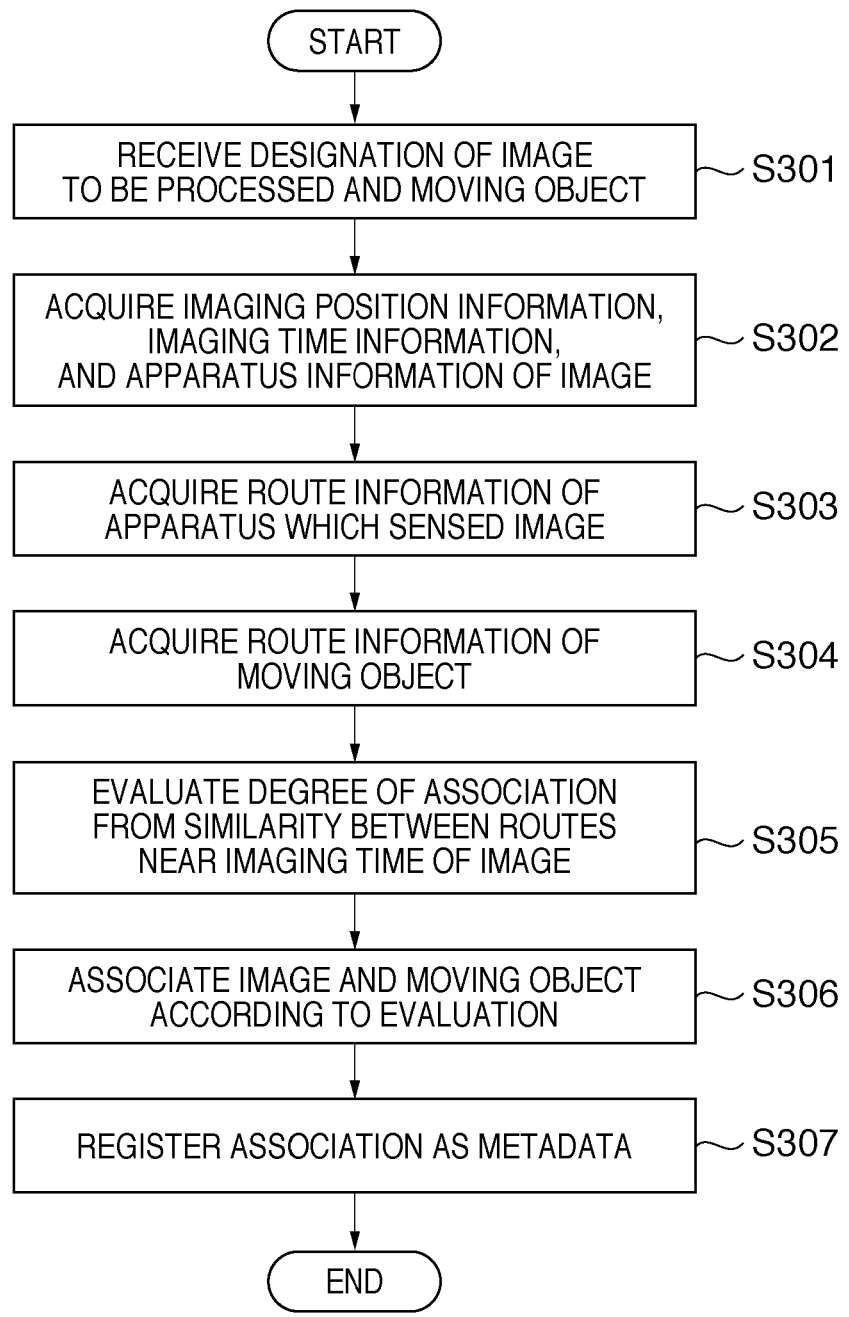

FIG. 4
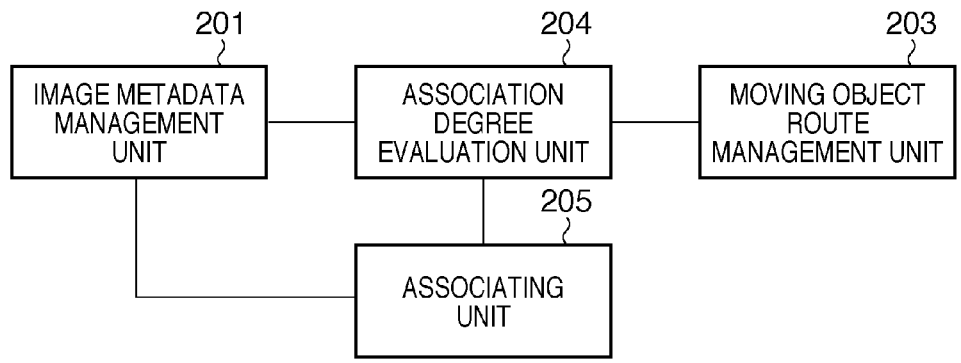
FIG. 5
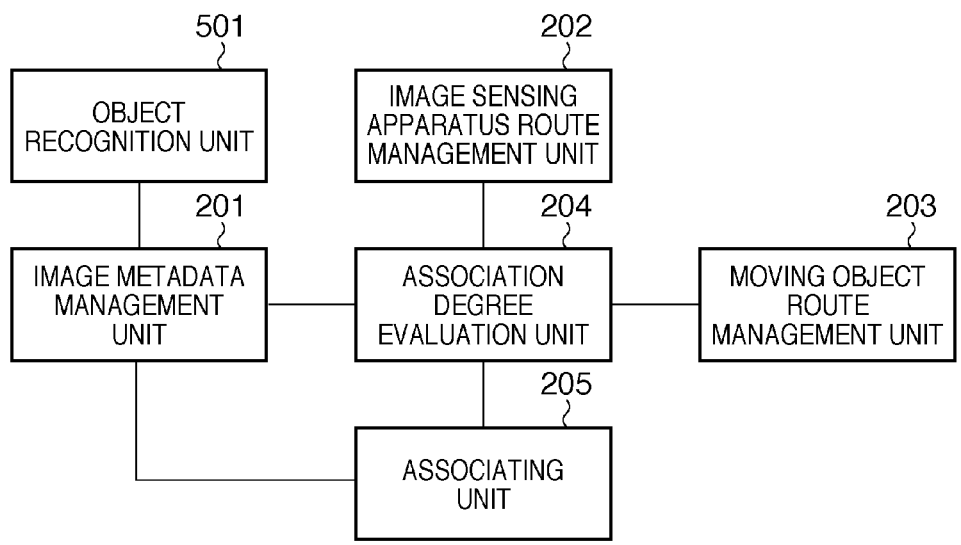
FIG. 6
| IMAGE ID | SAVING LOCATION | ...... | IMAGE SENSING APPARATUS | IMAGING TIME | IMAGING POSITION |
|---|---|---|---|---|---|
| XXXX | c:\photo | ...... | Cano Shot G9 | 2008/9/26 12:00AM | N35.56564 E139.68129 |
| | | ⋮ | | | |
| | | | | | |

|  | Ts |  | Tn-1 | Tn | Tn+1 |  | Te |
|---|---|---|---|---|---|---|---|
| MOVING OBJECT A | 1.3 |  | 1.5 | 1.0 | 1.2 |  | 1.1 |
| MOVING OBJECT B | 5.5 | ·········· | 2.1 | 1.1 | 1.5 | ·········· | 7.2 |
| MOVING OBJECT C | 10.0 |  | 12.5 | 11.1 | 12.2 |  | 11.3 |

|  | T1 | T2 | T3 | T4 | T5 |
|---|---|---|---|---|---|
| MOVING OBJECT A | 1.5 | 1.2 | 1.0 | 1.2 | 1.1 |
| MOVING OBJECT B | 3.8 | 2.1 | 1.1 | 7.2 | 20 |
| MOVING OBJECT C | 10.1 | 12.5 | 11.1 | 11.3 | 12.2 |

FIG. 11

| OBJECT | SCORE |
|---|---|
| X | 40 |
| Y | 35 |
| A | 15 |

FIG. 12

| OBJECT | SCORE |
|---|---|
| A | 85 |
| X | 40 |
| Y | 35 |

FIG. 13

| TIME INFORMATION | POSITION INFORMATION |
|---|---|
| ⋮ | ⋮ |
| 2008/9/26 11:59:55 | N35.56453 E139.68200 |
| 2008/9/26 12:00:00 | N35.56564 E139.68129 |
| ⋮ | ⋮ |

INFORMATION PROCESSING APPARATUS AND METHOD FOR REGISTERING MOVING OBJECTS AS METADATA OF AN IMAGE

BACKGROUND OF THE INVENTION

1. Field of the Invention

The present invention relates to a technique for associating an image with information related to this image.

2. Description of the Related Art

Conventionally, a method of automatically assigning information such as a person related to an image by recognition processing from a face image of an object (http://www.sony.co.jp/SonyInfo/technology/technology/theme/sface_01.html (updated Jan. 13, 2009)), and a method of making an imaging target hold a digital tag, reading the digital tag by a camera, and automatically associating an image and the target (Japanese Patent Laid-Open No. 2005-086759) have been proposed. Also, an apparatus, which acquires position information at the time of imaging using a GPS equipped in a camera, and assigning that information as metadata of a sensed image has been proposed (Japanese Patent Laid-Open No. 2001-292411).

However, the conventional method of identifying a face image is premised on that a face appears in an image. Even when a face exists at that site, if it does not appear in an image, no information can be associated with the image. Alternatively, since a side-faced object or his or her back shot cannot be identified, it is difficult to associate information with that image.

When a digital tag or the like is used, a reader for reading information of the digital tag has to be added to a camera. In this case, there are limitations and problems that an imaging target has to hold, in advance, a digital tag or the like which is to be read by the reader, and an image of that target has to be sensed while the reader faces the target.

Also, position information at the time of imaging can be assigned to an image as metadata. However, it is impossible to assign information about who joins an event including imaging as metadata.

SUMMARY OF THE INVENTION

The present invention has been made in consideration of the aforementioned problem and provides a technique for associating information related to an image with this image by a simpler method. Also, the present invention improves the precision of recognition processing of an object as information related to an image when that precision is insufficient.

According to the first aspect of the present invention, an information processing apparatus comprising:

a first acquisition unit which acquires a plurality of pieces of position information of an image sensing apparatus at times adjacent to an imaging time of an image by the image sensing apparatus;

a second acquisition unit which acquires a plurality of pieces of position information of a moving object at the adjacent times;

a calculation unit which calculates a similarity between a route of the image sensing apparatus and a route of the moving object based on the plurality of pieces of position information of the image sensing apparatus and the plurality of pieces of position information of the moving object; and a registration unit which registers as metadata of the image, when the similarity is higher than a pre-set threshold, information used to specify the moving object.

According to the second aspect of the present invention, an information processing method comprising:

a first acquisition step of acquiring a plurality of pieces of position information of an image sensing apparatus at times adjacent to an imaging time of an image by the image sensing apparatus;

a second acquisition step of acquiring a plurality of pieces of position information of a moving object at the adjacent times;

a calculation step of calculating a similarity between a route of the image sensing apparatus and a route of the moving object based on the plurality of pieces of position information of the image sensing apparatus and the plurality of pieces of position information of the moving object; and a registration step of registering as metadata of the image, when the similarity is higher than a pre-set threshold, information used to specify the moving object.

Further features of the present invention will become apparent from the following description of exemplary embodiments with reference to the attached drawings.

BRIEF DESCRIPTION OF THE DRAWINGS

FIG. 1 is a block diagram showing an example of the hardware arrangement of a computer 100;

FIG. 2 is a block diagram showing an example of the functional arrangement of an information processing apparatus according to the first embodiment;

FIG. 3 is a flowchart of processing to be executed by the computer 100;

FIG. 4 is a block diagram showing an example of the functional arrangement of an information processing apparatus according to the third embodiment;

FIG. 5 is a block diagram showing an example of the functional arrangement of an information processing apparatus according to the fifth embodiment;

FIG. 6 shows an example of the configuration of a management table;

FIG. 11 is a table showing scores;

FIG. 12 is a table showing the correction result of a score of object A by an object recognition unit 501;

FIG. 13 is a table showing an example of the configuration of route information;

DESCRIPTION OF THE EMBODIMENTS

Figures 7, 8:
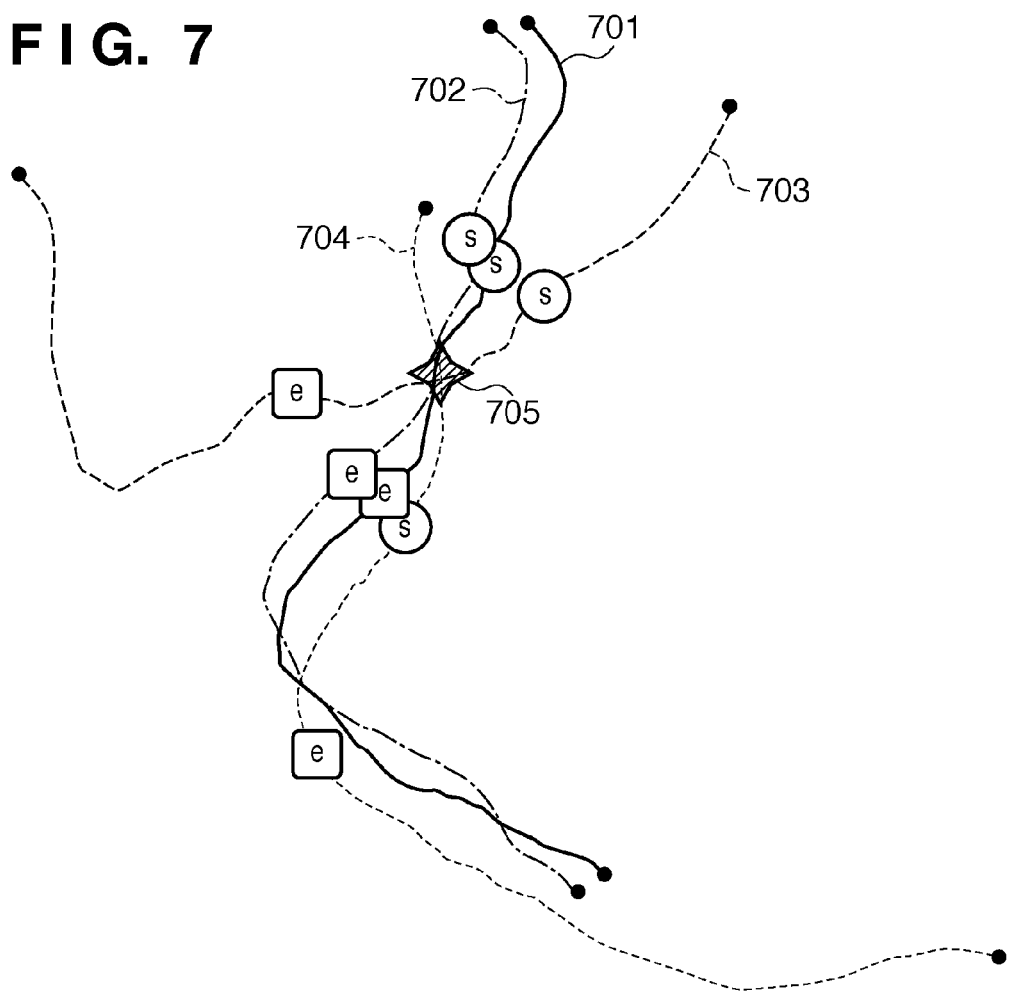
FIG. 7 is a view for explaining routes of an image sensing apparatus and moving objects on a two-dimensional plane.
FIG. 8 is a table showing distances between the image sensing apparatus and moving objects A, B, and C.

Embodiments of the present invention will be described hereinafter with reference to the accompanying drawings. Note that each of the embodiments to be described hereinafter is an example when the present invention is practiced, and is one of practical embodiments of the arrangement described in the scope of the claims.

First Embodiment

FIG. 1 is a block diagram showing an example of the hardware arrangement of a computer 100 applicable to an information processing apparatus according to this embodiment. Note that the arrangement shown in FIG. 1 is implemented by one computer 100 in this embodiment. However, an arrangement equivalent to that shown in FIG. 1 may be implemented by a plurality of computers. When this embodiment is implemented by a plurality of computers, these computers make data communications with each other via a network such as a LAN.

Referring to FIG. 1, a CPU 101 controls the overall computer 100 using computer programs and data stored in a ROM 102 and RAM 103, and executes respective processes to be described later as those which are to be implemented by the computer 100.

The ROM 102 stores setting data, a boot program, and the like of the computer 100. The RAM 103 has an area used to temporarily store computer programs and data loaded from an external storage device 104, and those externally received via a network interface 107. Furthermore, the RAM 103 has a work area used when the CPU 101 executes various processes. That is, the RAM 103 can provide various areas as needed.

The external storage device 104 is a large-capacity storage device represented by a hard disk drive. The external storage device 104 saves an OS (Operating System), and computer programs and data required to make the CPU 101 execute various processes to be described later as those which are to be implemented by the computer 100. Also, the external storage device 104 saves information described as given information in the following description. The computer programs and data saved in the external storage device 104 are loaded as needed onto the RAM 103 under the control of the CPU 101, and are to be processed by the CPU 101.

Note that other external storage devices of the computer 100 may be used in addition to the external storage device 104. For example, a memory card, flexible disk, optical disk such as a Compact Disk (CD), magnetic and optical cards, IC card, and the like are applicable.

An input device 109 includes a keyboard and mouse. When the user of the computer 100 operates the input device 109, he or she can input various instructions to the CPU 101.

An input device interface 105 is used to connect the input device 109 to the computer 100. The CPU 101 is notified of an operation instruction, which is input when the user operates the input device 109, via this input device interface 105 and a system bus 108.

An output device 110 is represented by a display device including a CRT or liquid crystal display, and can output data in an arbitrary form. Data to be output which is processed in the computer 100 is output to this output device 110 via an output device interface 106.

The network interface 107 is used to connect the computer 100 to a network line 111 such as a LAN or the Internet. The computer 100 can make data communications with apparatuses on the network line 111 via the network interface 107.

FIG. 2 is a block diagram showing an example of the functional arrangement of the information processing apparatus according to this embodiment. As shown in FIG. 2, the information processing apparatus according to this embodiment includes an image metadata management unit 201, image sensing apparatus route management unit 202, association degree evaluation unit 204, associating unit 205, and moving object route management unit 203. Note that the respective units shown in FIG. 2 are saved in the external storage device 104 as computer programs in this embodiment. Alternatively, these units may be implemented by hardware.

The image metadata management unit 201 manages the following pieces of information for each image sensed by the image sensing apparatus. That is, the unit 201 manages, as a set for each image, pieces of auxiliary information (metadata) including imaging position information indicating a position (imaging position) of the image sensing apparatus at the time of imaging, imaging time information indicating an imaging time, and apparatus information used to specify this image sensing apparatus. Such set is acquired, for example, as follows.

Assume that one image is sensed using the image sensing apparatus. At this time, imaging position information obtained from a GPS (Global Positioning System) equipped in the image sensing apparatus, imaging time information measured by a timer incorporated in the image sensing apparatus, and apparatus information such as an ID unique to the image sensing apparatus are acquired from this image sensing apparatus. These pieces of acquired information are registered as metadata in the external storage device 104 together with the sensed image. These respective pieces of registered information are managed by the image metadata management unit 201.

Note that the metadata may be registered in the external storage device 104 in various modes. For example, the metadata may be embedded in the sensed image in a specific format, thereby registering the metadata in the external storage device 104 together with the image. Alternatively, the metadata may be registered in the external storage device 104 or an external database as a file independent of the image. That is, the registration mode is not particularly limited as long as image data and metadata can be handled in association with each other. In the following description of this embodiment, assume that an image body and metadata are registered in the external storage device 104 as independent files, and pieces of information associated with them are managed by the image metadata management unit 201.

FIG. 6 shows an example of the configuration of a management table used to manage an image file registered in the external storage device 104 and metadata for this image file. This management table is managed by the image metadata management unit 201.

An ID (image ID) unique to a sensed image is registered in a field 610. When an image is registered as a file in the external storage device 104, a path name of this image file in the external storage device 104 is registered in a field 620. Apparatus information as information unique to an image sensing apparatus which was used to sense an image is registered in a field 601. Imaging time information of this image is registered in a field 602. Imaging position information of this image is registered in a field 603.

An example shown in FIG. 6 indicates that an image with an image ID "XXXX" is registered in the external storage device 104 to have a path "c:¥photo". Furthermore, an image sensing apparatus used to sense this image is "Cano Shot G9", its imaging time is "2008/9/26 12:00 AM", and its imaging position is "N35.56564 E139.68129".

In this way, every time the image sensing apparatus senses an image, pieces of information described above corresponding to the fields 610, 620, 601, 602, and 603 are registered for each sensed image. The image metadata management unit 201 executes this registration processing. The sensed image may be either a still image or movie. In this embodiment, assume that each sensed image is a still image.

The image sensing apparatus route management unit 202 manages, for each image sensing apparatus, route information that records pieces of position information of the image sensing apparatus (image sensing apparatus position information) measured at respective predetermined timings (periodically) (first management). The acquisition mode of the image sensing apparatus position information is not particularly limited. For example, as described above, pieces of image sensing apparatus position information are periodically acquired from the GPS (Global Positioning System) equipped in the image sensing apparatus, and respective pieces of acquired image sensing apparatus position information may be registered in the route information. Note that the route information for each image sensing apparatus is associated with image sensing apparatus information of the corresponding image sensing apparatus.

The moving object route management unit 203 manages, for each moving object, route information that records pieces of position information of a moving object such as a person or vehicle for respective times (moving object position information) (second management). The acquisition mode of this route information is not particularly limited. For example, when a moving object is a person, pieces of position information for respective times of the person may be recorded using a GPS function of his or her mobile phone, and may be acquired and managed by the moving object route management unit 203 as route information of that person. Alternatively, when one is in automobile, history information recorded by a car navigation system may be acquired as route information, and that information may be managed by the moving object route management unit 203. Note that the route information for each moving object is associated with information (moving object information) unique to the corresponding moving object.

Note that the route information managed by each of the image sensing apparatus route management unit 202 and moving object route management unit 203 is registered with pieces of position information at respective times, and has a configuration, as shown in, for example, FIG. 13. FIG. 13 shows an example of the configuration of the route information. In FIG. 13, pieces of position information (latitude, longitude) are registered at 5-sec intervals. Note that the route information managed by the image sensing apparatus route management unit 202 and moving object route management unit 203 may be uploaded onto an external apparatus depending on its data size.

Referring back to FIG. 2, the association degree evaluation unit 204 calculates a degree of association between a designated image and designated moving object using pieces of information respectively managed by the image metadata management unit 201, image sensing apparatus route management unit 202, and moving object route management unit 203. Processing for calculating the degree of association will be described later.

The associating unit 205 decides based on the degree of association calculated by the association degree evaluation unit 204 whether or not the designated image and designated moving object are to be associated with each other. The associating unit 205 registers information indicating the degree of association in the external storage device 104 as metadata for the designated image.

FIG. 3 is a flowchart of processing to be executed by the computer 100 so as to associate an image and moving object with each other. Note that the respective units shown in FIG. 2 will be explained as main bodies of the processing below. However, as described above, since all of these units are implemented by computer programs, the CPU 101 which executes these computer programs serves as a main body of the processing in practice.

The user makes an operation for designating an image and moving object to be associated with each other using the input device 109. For example, a list of an image group and pieces of moving object information of respective moving objects, which have already been registered in the external storage device 104, is displayed on a display screen of a display device as the output device 110. The user designates one image and one moving object information using the input device 109. Therefore, the association degree evaluation unit 204 receives an operation instruction from the user in step S301. This operation instruction includes an ID of the image and moving object information designated by the user.

Of course, the designation method of an image and moving object as targets in the following processing is not particularly limited. For example, an image and moving object may be input using a user instruction outside the computer 100 or may be designated by internal processing in the computer 100. For example, when the CPU 101 detects that a new image is registered in the external storage device 104, it may internally and automatically select a moving object in turn from moving object route information which is close to the imaging time and imaging position of this image.

In step S302, the association degree evaluation unit 204 acquires imaging time information, imaging position information, and apparatus information, which are managed by the image metadata management unit 201 in association with the ID of the image included in the operation instruction received in step S301.

In step S303, the association degree evaluation unit 204 executes the following processing (first acquisition). That is, the unit 204 acquires pieces of image sensing apparatus position information at respective times within a time range adjacent to an imaging time indicated by the imaging time information acquired in step S302 from route information which is managed by the image sensing apparatus route management unit 202 in association with the apparatus information acquired in step S302. Note that in this step the unit 204 may acquire the route information itself which is managed by the image sensing apparatus route management unit 202 in association with the apparatus information acquired in step S302.

In step S304, the association degree evaluation unit 204 executes the following processing (second acquisition). That is, the unit 204 acquires pieces of moving object position information at respective times within the adjacent time range from route information which is managed by the moving object route management unit 203 in association with the moving object information included in the operation instruction acquired in step S301. Note that in this step the unit 204 may acquire the route information itself, which is managed by the moving object route management unit 203 in association with the moving object information included in the operation instruction acquired in step S301.

In step S305, the association degree evaluation unit 204 compares the image sensing apparatus position information group (partial route information of the image sensing apparatus) acquired in step S303 and the moving object position information group (partial route information of the moving object) acquired in step S304. With this comparison, the unit 204 calculates a similarity between the route of the image sensing apparatus and that of the moving object within the adjacent time range. Various methods of calculating the similarity of the routes are available, and an arbitrary method may be used. In this embodiment, the unit 204 evaluates, using this similarity, a degree of association between the image and moving object, which are designated by the user.

An example of processing for evaluating the degree of association between the image and moving object, which are designated by the user, will be described below with reference to FIGS. 7 and 8. FIGS. 7 and 8 will explain a case in which the degree of association between each of a plurality of moving objects and an image is to be evaluated. However, this explanation does not limit the number of moving objects.

FIG. 7 is a view for explaining routes of the image sensing apparatus and moving objects on a two-dimensional plane. Referring to FIG. 7, reference numeral 701 denotes a route of the image sensing apparatus. Reference numeral 702 denotes a route of moving object A; 703, that of moving object B; and 704, that of moving object C. Assume that these routes 701 to 704 are those within a certain time range (2008/9/26 9:00 to 15:00). Reference numeral 705 denotes an imaging position at an imaging time "2008/9/26 12:00" of the image designated by the user. Also, "s" on each route indicates the position on that route at time Ts 30 minutes before the imaging time "2008/9/26 12:00". Furthermore, "e" on each route indicates the position on that route at time Te 30 minutes after the imaging time "2008/9/26 12:00".

The association degree evaluation unit 204 executes the following processing. That is, the unit 204 calculates, using the respective pieces of route information, distances between the image sensing apparatus and moving objects A, B, and C at respective times (for example, divided times when a time range (in this case, a Ts-to-Te range) including the imaging time of the designated image is divided at equal intervals) within that time range. FIG. 8 is a table showing the distances between the image sensing apparatus and moving objects A, B, and C at respective times within the Ts-to-Te range. In FIG. 8, "2008/9/26 12:00" is indicated by Tn.

The association degree evaluation unit 204 calculates a distance between the position of the image sensing apparatus and that of moving object A at time Ts using the image sensing apparatus position information group acquired in step S303 and moving object position information group of moving object A acquired in step S304. In FIG. 8, this distance is "1.3". Likewise, the association degree evaluation unit 204 calculates a distance between the position of the image sensing apparatus and that of moving object B at time Ts using the image sensing apparatus position information group acquired in step S303 and moving object position information group of moving object B acquired in step S304. In FIG. 8, this distance is "5.5". Likewise, the association degree evaluation unit 204 calculates a distance between the position of the image sensing apparatus and that of moving object C at time Ts using the image sensing apparatus position information group acquired in step S303 and moving object position information group of moving object C acquired in step S304. In FIG. 8, this distance is "10.0".

In this way, the association degree evaluation unit 204 calculates the distances between the image sensing apparatus and moving objects A, B, and C at respective times within the range from time Ts to time Te. Note that the method of calculating a distance is not particularly limited, and various methods may be applied. For example, differences between the latitude and longitude values may be used intact as a distance, or they may be converted into a distance (meters).

Next, the association degree evaluation unit 204 calculates a variance value and average value of the distances calculated for moving object A, those of the distances calculated for moving object B, and those of the distances calculated for moving object C. Since it is considered that a moving object with the smaller calculated variance value and average value has a higher similarity between the route of the apparatus used to sense the image designated by the user and that of this moving object, the unit 204 evaluates that a degree of association between these image and moving object is high.

According to FIG. 8, the distances between the positions of the image sensing apparatus and those of moving object A at respective times are small, and their average and variation (variance value) are also small. In such case, the association degree evaluation unit 204 determines that a similarity between the route 701 of the image sensing apparatus and the route 702 of moving object A is high, and evaluates that a degree of association between the image sensed at the imaging time "2008/9/26 12:00" and moving object A is high.

On the other hand, as for moving object B, the distance from the image sensing apparatus at time Tn is relatively small, but the distances at times Ts and Te are relatively large. Although the average value of the distances between the positions of the image sensing apparatus and those of moving object B at respective times is relatively small, their variance value is larger than that of moving object A. For this reason, the association degree evaluation unit 204 evaluates that moving object B has a lower degree of association with the image sensed at the imaging time "2008/9/26 12:00" than moving object A.

On the other hand, the shape of the route 704 of moving object C is similar to that of the route 701 of moving object A. However, the positions of moving object C at respective times within the range from time Ts to time Te are relatively largely different from those of the image sensing apparatus at respective times within the range from time Ts to time Te. For this reason, according to FIG. 8, the distances between the positions of the image sensing apparatus and those of moving object C at respective times are large, and their average and variation (variance value) are also large. In such case, the association degree evaluation unit 204 determines that a similarity between the route 701 of the image sensing apparatus and the route 704 of moving object C is lower than moving object A. Therefore, the unit 204 evaluates that a degree of association between the image sensed at the imaging time "2008/9/26 12:00" and moving object C is lower than moving object A.

In this embodiment, the degrees of association are evaluated using the similarities of the routes, as described above. Note that the similarities have been described using abstract expressions (for example, a similarity is high/low). However, in practice, a threshold is set for numerical values to make stricter judgments.

For example, the association degree evaluation unit 204 evaluates a degree of association between the image and moving object selected by the user using a calculated average value X and variance value (standard deviation) Y. The association degree evaluation unit 204 determines a similarity between the routes using the average value X and variance value Y. When the average value X meets $X \leq th1$ with respect to a threshold th1, and the variance value Y meets $Y \leq th2$ with respect to a threshold th2, the unit 204 judges that a similarity is high. Otherwise, the unit 204 judges that a similarity is low.

When the association degree evaluation unit 204 judges that the similarity is high, it evaluates that a degree of association between the image and moving object designated by the user is "high". When the unit 204 judges that the similarity is low, it evaluates that a degree of association is "low" (no association).

In this way, the degree of association between the image and moving object is evaluated based on the average value X and variance value Y. Note that the number of evaluation stages is not limited to two. For example, three evaluation stages may be used as follows.

Upon calculating the average value X, a weighted average value is calculated by giving larger weights as the moving object is temporally closer to the designated image. When the weighted average value X meets X≤th1 with respect to the threshold th1, and the variance value Y meets Y≤th2 with respect to the threshold th2, the association degree evaluation unit 204 judges that a similarity is "high in the entire route". At this time, the unit 204 evaluates a degree of association like "acted together". When the average value X meets X≤th1 with respect to the threshold th1, and the variance value Y meets Y>th2 with respect to the threshold th2, the unit 204 judges that a similarity is "high near the selected image". At this time, the unit 204 evaluates a degree of association like "stayed in close at the time of imaging of the selected image". In other cases, the unit 204 judges that a similarity is "low", and evaluates a degree of association as "no association".

Referring back to FIG. 3, in step S306 the associating unit 205 associates the image and moving object which are designated by the user in accordance with the evaluated degree of association based on the degree of association evaluated in step S305.

In step S307, the associating unit 205 registers information indicating the contents associated in step S306 in the external storage device 104 as new metadata of the image designated by the user. For example, when the association degree evaluation unit 204 evaluates the degree of association as "acted together" in the aforementioned example, the unit 205 registers information indicating a moving object acted together as that indicating this evaluation. For example, a name of a member who traveled together is registered in metadata of the image.

As described above, according to this embodiment, a degree of association between a moving object such as a person and an image is calculated based on the imaging time information and imaging position information of the image and a similarity between the route information of the image sensing apparatus used to sense this image and that of the moving object, and they are associated with each other according to the degree of association. In this way, information of, for example, a person related to each individual image can be efficiently and precisely assigned independently of whether or not that person appears in the image.

Second Embodiment

In the first embodiment, the image sensing apparatus route management unit 202 acquires route information of an image sensing apparatus from that image sensing apparatus. However, the image sensing apparatus need not always hold the route information of the image sensing apparatus.

For example, "when" the image sensing apparatus was ready to communicate with "which" GPS terminal such as a mobile phone is recorded using a near field wireless communication technique such as UWB (Ultra Wideband). Then, based on that record, pieces of route information of respective GPS terminals which were located near the image sensing apparatus are joined to acquire route information of the image sensing apparatus.

Alternatively, a photographer who held the image sensing apparatus is specified, and route information may be acquired from a GPS terminal such as a mobile phone of the specified photographer. However, since the image sensing apparatus may be shared by a plurality of photographers, a mechanism that allows identifying a photographer who holds the image sensing apparatus accordingly is required. For example, a photographer is identified using biometrics such as fingerprint authentication to record "when" and "who" held the image sensing apparatus. Thus, pieces of route information while each photographer held the image sensing apparatus are joined to find the route of the image sensing apparatus.

According to these methods, the route information of the image sensing apparatus can be acquired without providing any arrangement for acquiring position information to the image sensing apparatus. Note that, for example, an owner of the image sensing apparatus is often decided to have a role as a photographer. In such case, the route information of a GPS terminal of the photographer may be used intact as that of the image sensing apparatus. This method may have insufficient precision as route information of the image sensing apparatus compared to the route information measured by the image sensing apparatus or the method using communications between the GPS terminal and image sensing apparatus. However, this method has an advantage of easily acquiring route information without adding any arrangement to the image sensing apparatus.

Third Embodiment

In the first embodiment, the image sensing apparatus route management unit 202 manages route information of an image sensing apparatus, and a degree of association between an image and moving object is decided by comparing the managed route information and that managed by the moving object route management unit 203. This embodiment will explain a technique that can achieve the same object without using the route information of the image sensing apparatus. Note that only differences from the first embodiment will be explained below.

The hardware arrangement of an information processing apparatus according to this embodiment uses that shown in FIG. 1, and the functional arrangement adopts that shown in FIG. 4. FIG. 4 is a block diagram showing an example of the functional arrangement of the information processing apparatus according to this embodiment. This embodiment uses imaging position information of an image designated by the user and that of an image sensed by the same image sensing apparatus as that which sensed this image in place of route information of the image sensing apparatus. More specifically, an association degree evaluation unit 204 acquires imaging position information of an image designated by the user from an image metadata management unit 201. Furthermore, the association degree evaluation unit 204 acquires imaging position information of an image, which is associated with the same image sensing apparatus information as that of the image designated by the user and imaging time information indicating an imaging time adjacent to that indicated by the imaging time information of this image from the image metadata management unit 201.

Then, the association degree evaluation unit 204 calculates distances between the respective pieces of acquired imaging position information and respective pieces of position information of a moving object. In this calculation, a distance between the imaging position information and position information at the same time is calculated as in the first embodiment. Thus, distances at respective times can be calculated.

Figures 9, 10:
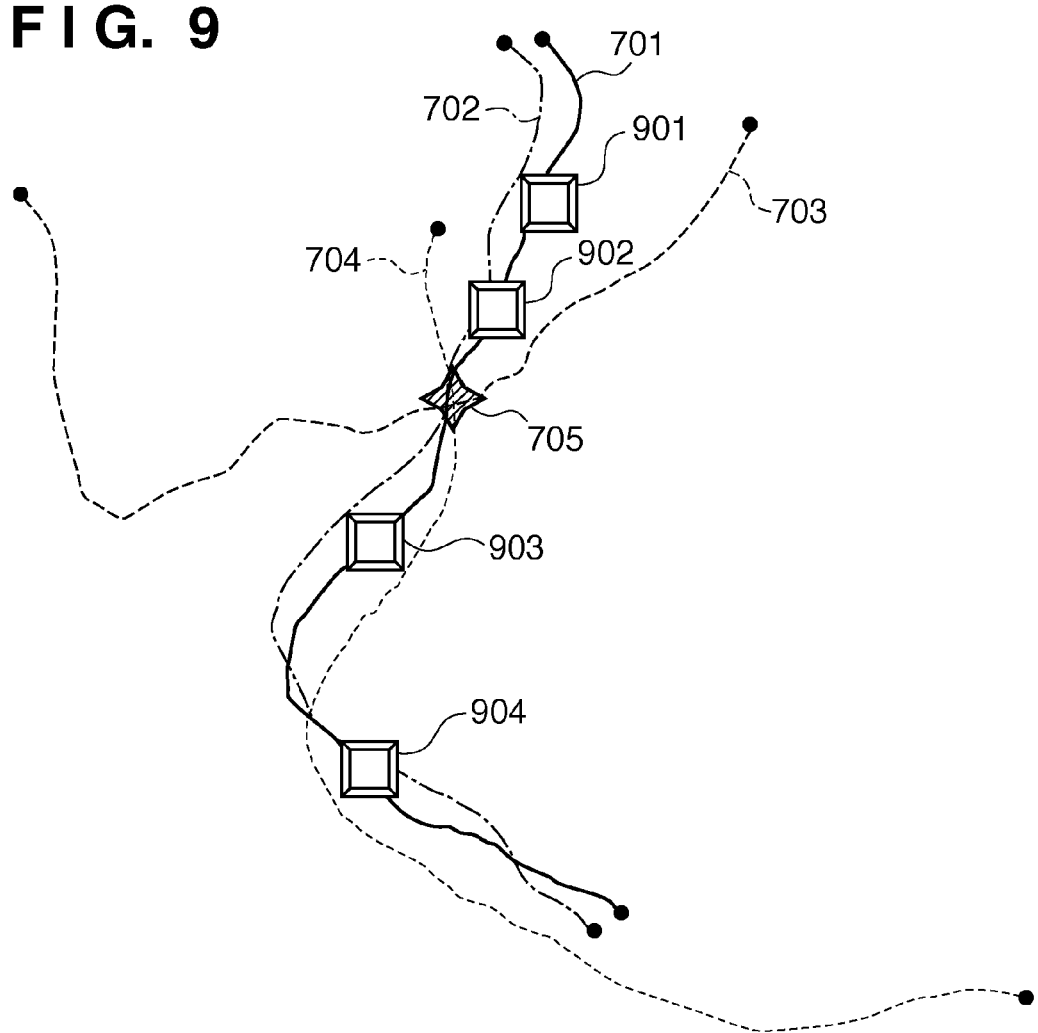
FIG. 9 is a view for explaining routes of an image sensing apparatus and moving objects on a two-dimensional plane.
FIG. 10 is a table showing distances calculated by an association degree evaluation unit 204.

FIG. 9 is a view for explaining routes of the imaging sensing apparatus and moving objects on a two-dimensional plane. Reference numerals 901 to 904 denote positions indicated by pieces of imaging position information of images associated with pieces of imaging time information indicating adjacent times of imaging time information of an image designated by the user. In this case, the association degree evaluation unit 204 calculates a distance between a position x (=positions 901 to 904) and a position on a route 702 at the same time as the position x. Likewise, the association degree evaluation unit 204 calculates a distance between the position x (=positions 901 to 904) and a position on a route 703 at the same time as the position x. Also, the association degree evaluation unit 204 calculates a distance between the position x (=positions 901 to 904) and a position on a route 704 at the same time as the position x.

FIG. 10 shows the distances calculated by the association degree evaluation unit 204 in association with the routes 702 to 704. Reference numeral T1 denotes a time indicated by imaging time information at the position 901; T2, a time indicated by imaging time information at the position 902; T3, an imaging time of the image designated by the user; T4, a time indicated by imaging time information at the position 903; and T5, a time indicated by imaging time information at the position 904. For example, according to FIG. 10, a distance between the position 901 and a position on the route 702 at the time T1 as that at the position 901 is 1.5. Also, a distance between the position 903 and a position on the route 704 at the time T4 as that at the position 903 is 11.3.

Then, similarly to the first embodiment, the association degree evaluation unit 204 calculates the average values and variance values of the distances of the routes 702 to 704, and calculates the degree of association between the image and moving object designated by the user using these calculated statistical amounts.

Since this embodiment is premised on that a target image is sensed in a series of operations, images have to be sensed before and after the target image (the positions 901 to 904 in FIG. 9). Since the number of points to be compared is more likely to be smaller than that upon comparison of routes, the calculation volume can be reduced compared to that upon comparison of routes. Also, since the need for acquiring and saving routes can be obviated, storage areas and a mechanism for that purpose can be reduced. In this embodiment, the number of imaging times is three. However, the number of imaging times is not particularly limited as long as it is one or more.

Fourth Embodiment

In the first embodiment, after a degree of association is calculated, the associating unit 205 performs association without intervention of the user. However, after the degree of association is calculated, it may be displayed on a display screen of a display device, and it is inquired the user about whether or not to permit association using this degree of association. When the user inputs an instruction to permit association, the processing by the associating unit 205 is then started as in the first embodiment.

According to this arrangement, although an additional user operation is required compared to the first embodiment, since more intended metadata is easily assigned, there is a merit of enhancing the precision and effect at the time of re-use.

Fifth Embodiment

In the first embodiment, "information indicating a degree of association" generated by the associating unit 205 is merely registered in the external storage device 104 as metadata in association with an image. However, this embodiment uses this metadata to correct the recognition result of an object as a moving object. Only differences from the first embodiment will be described below.

FIG. 5 is a block diagram showing an example of the functional arrangement of an information processing apparatus according to this embodiment. The arrangement shown in FIG. 5 is obtained by adding an object recognition unit 501 to that shown in FIG. 1. The object recognition unit 501 recognizes an object (moving object) using an image of the object sensed by an image sensing apparatus, and calculates a score indicating an accuracy of recognition. The accuracy of the recognition result of such object recognition processing varies due to various factors such as appearances of the object including distances from the object and orientations of the object, degrees of in-focus, and the quality and volume of teacher data for recognition.

When the accuracy of the recognition result is insufficient, recognition different from an actual correct answer is often made. Adopting a wrong recognition result as the object of the image unwantedly results in noise at the time of re-use, in other words, it causes search errors upon using object information in, for example, a search. This embodiment uses the degree of association between the object as the moving object and the image to correct the recognition result of the object.

For example, assume that the recognition results shown in FIG. 11 are obtained by the recognition processing of the object recognition unit 501. FIG. 11 shows top three scores according to the accuracies of the recognition results as a result of the recognition processing for objects by the object recognition unit 501. Assume that the score of object X as a recognition result of an object to be recognized exhibits a largest value in FIG. 11, but object A is a correct answer as a recognition result in practice. At this time, if a degree of association between an image and object A is high upon execution of the processing according to the first embodiment to have object A as a moving object, object A and the image are associated with each other since they have a strong association. For example, this score is corrected by multiplying the score of object A by a similarity calculated for object A and the image. The object recognition unit 501 corrects the score.

FIG. 12 shows the correction result of the score of object A shown in FIG. 11 by the object recognition unit 501. As shown in FIG. 12, the score of object A is corrected to the highest score.

Upon practicing this embodiment, a target moving object of a moving object route management unit 203 has to be the same as an object to be recognized by the object recognition unit 501. Therefore, the recognition result of the object recognition unit 501 should be associated with information (object information) unique to the object to be recognized. Then, whether or not the target moving object of the moving object route management unit 203 is the same as the object to be recognized by the object recognition unit 501 can be judged by checking whether or not the object information is the same as the moving object information. Alternatively, for example, an associating unit 205 may manage a correspondence table used to identify the moving object and object. In this manner, various methods about a mechanism for specifying whether or not the moving object is the same as the object are available, and any of these methods may be used.

As described above, according to this embodiment, the quality of information as an object can be improved. Hence, the recognition result with insufficient accuracy can be suppressed from being associated with an image as object information. The first embodiment reveals only the presence of association between the moving object and image. However, according to this embodiment, the recognition result can be associated as object information. Also, effects infeasible in each of the recognition processing of this embodiment and the associating processing of the first embodiment can be obtained.

Sixth Embodiment

In the above embodiments, still images have been mainly described as targets. However, movies may be used. In case of a movie, processing may be applied to portions obtained by dividing the entire movie. For example, a movie may be divided into scenes, and processing may be applied to consider each scene as one still image in the above embodiments. Alternatively, processing may be applied to every data for n frames. In addition, when latitude information and longitude information are periodically acquired, movie data falling within a certain range may be used as one portion. Of course, one entire movie data may be handled as a target to be processed.

Seventh Embodiment

This embodiment will explain a display example using an association between an image and moving object described in the first embodiment. Note that only differences from the first embodiment will be described below.

Figure 14:
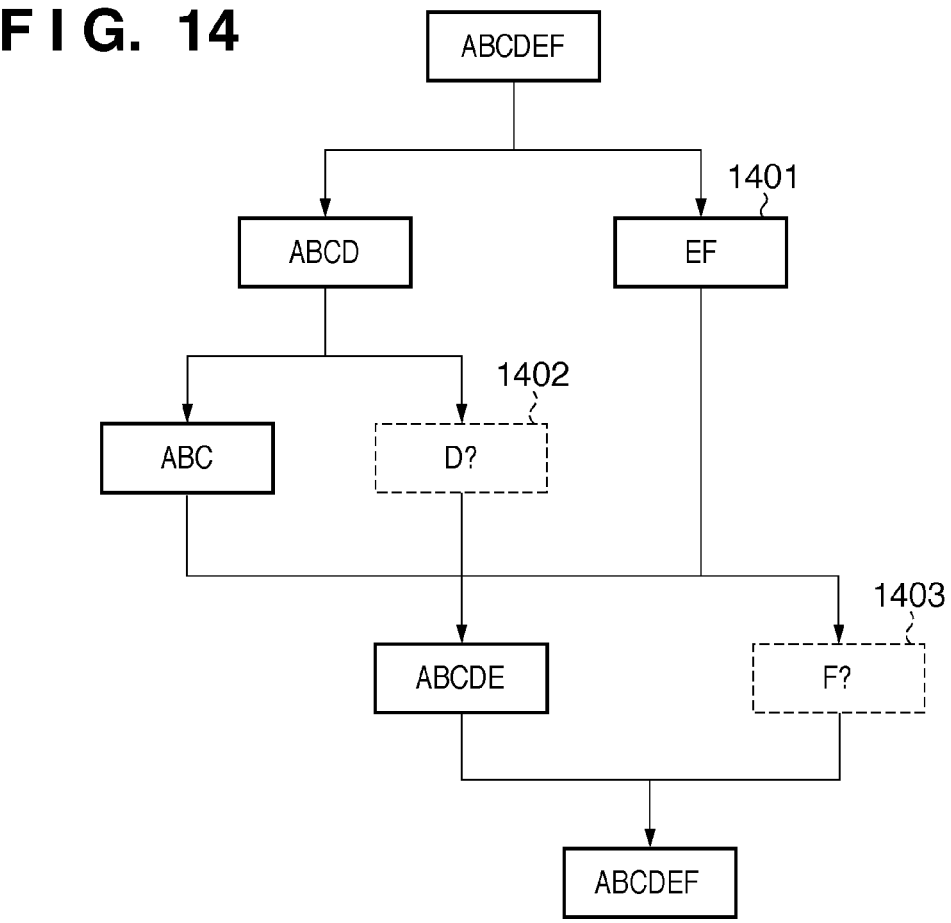
FIG. 14 is a view showing a display example in the fourth embodiment.

FIG. 14 shows an example in which configurations of subgroups and their transitions are extracted from pieces of moving object information associated with respective images and they are displayed when a group including a plurality of persons are separated into some subgroups and make imaging actions. In a practical application case, a plurality of persons take a trip or hold an event.

This example shows transitions of subgroups in which six persons A, B, C, D, E, and F started actions, and acted together until the end of actions. Such display can be used to allow the user to easily input an instruction to search for an image related to himself or herself or an image to which the user himself or herself was not related (of which he or she did not know). For example, FIG. 14 can be used as a GUI (Graphical User Interface) on which person A clicks a subgroup (for example, a subgroup 1401) as a combination of persons other than himself or herself to display images of this subgroup.

Figure 15:
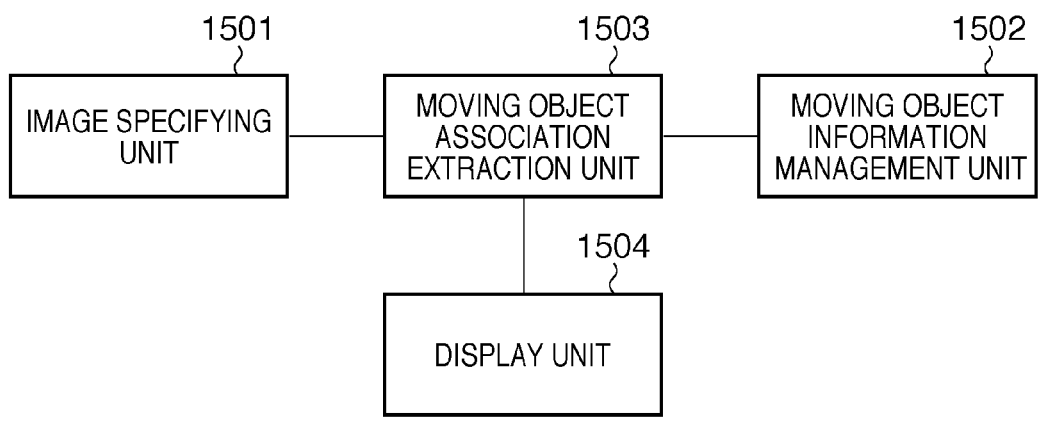
FIG. 15 is a block diagram showing an example of the functional arrangement of an information processing apparatus according to the seventh embodiment.

FIG. 15 is a block diagram showing an example of the functional arrangement of an information processing apparatus according to this embodiment. An image specifying unit 1501 specifies an image group which belongs to a specific group from those registered in an external storage device 104. For example, the image specifying unit 1501 specifies an image group sensed during, for example, a trip or event. Various mechanisms for specifying an image group that belongs to a specific group are available.

For example, to images to be registered in the external storage device 104, labels such as "trip" and "athletic festival" are assigned as metadata. Thus, when the image specifying unit 1501 specifies images sensed in, for example, "athletic festival", it refers to labels of images registered in the external storage device 104, and specifies images assigned with the label "athletic festival".

Also, images which were registered at once or at the same date and time in the external storage device 104 may define one group, and a label may be assigned to each group, as described above. As described in the first embodiment, when a route of an image sensing apparatus is detected, an image group which belongs to a specific group may be specified based on the moving range of the image sensing apparatus.

A moving object information management unit 1502 manages pieces of information related to moving objects associated with images. Such association method is not particularly limited. For example, images and moving objects may be associated by the processing described in the first embodiment or may be manually associated by the user. In this embodiment, assume that the pieces of information related to moving objects are registered in the external storage device 104 as files independently of images.

A moving object association extraction unit 1503 acquires information of moving objects associated with each image group specified by the image specifying unit 1501 from the moving object information management unit 1502. Then, the unit 1503 extracts associations between moving objects in respective images. In this embodiment, the unit 1503 checks an increase/decrease in number of moving objects in a series of images specified by the image specifying unit 1501, and extracts information of moving objects which were likely to act together and their transitions.

A display unit 1504 generates a screen exemplified in FIG. 14 from information of moving objects which are likely to act together and their transitions extracted by the moving object association extraction unit 1503, and outputs the generated screen to an output device 110 via an output device interface 106. FIG. 14 shows a state in which moving objects which acted together changed according to an increase/decrease in number of moving objects associated with a series of images.

Figure 16:
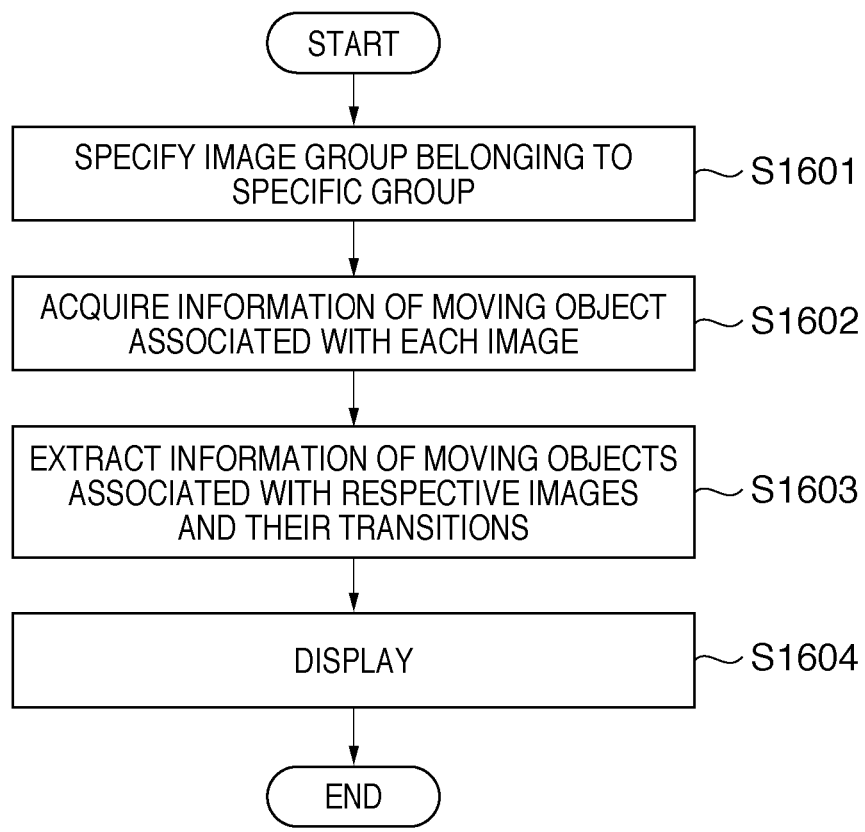
FIG. 16 is a flowchart of processing to be executed by the information processing apparatus according to the seventh embodiment.

FIG. 16 is a flowchart of processing executed by the information processing apparatus according to this embodiment. In step S1601, the image specifying unit 1501 specifies an image group which belongs to a specific group from those registered in the external storage device 104. The user may designate the specific group using an input device 109 or that specific group may be designated in advance.

In step S1602, the moving object association extraction unit 1503 acquires information of a moving object associated with each image included in the image group specified by the image specifying unit 1501 from the moving object information management unit 1502.

In step S1603, the moving object association extraction unit 1503 extracts information of moving objects associated with respective images and their transitions. In this embodiment, the unit 1503 checks an increase/decrease in number of moving objects associated with a series of images specified by the image specifying unit 1501, and extracts information of moving objects which were likely to act together and their transitions.

In step S1604, the display unit 1504 generates the screen exemplified in FIG. 14 from the information of moving objects which were likely to act together and their transitions extracted by the moving object association extraction unit 1503. Then, the display unit 1504 outputs the generated screen to the output device 110 via the output device interface 106. At this time, a moving object, an action of which cannot be specified since there is no associated sensed image may appear. A method of displaying such moving object is not particularly limited as long as a message indicating that the action of that moving object is indefinite can be displayed. For example, in FIG. 14, moving objects, actions of which are indefinite, are distinguished by blocks displayed using broken lines like blocks 1402 (an action of person D is indefinite) and 1403 (an action of person F is indefinite). In addition, blocks may be distinguished by using different colors, by flickering, by using different fonts, or by displaying messages indicating that an action is indefinite. Note that the above embodiments may be combined as needed or may be selectively used as needed.

<Another Method of Calculating Similarity Between Routes of Image Sensing Apparatus and Moving Object>

As described above, other methods of calculating the similarity are available, and one of these methods will be described below. Assume that the method to be described below collects and manages pieces of information of times and positions of an object (to be referred to as object position/time information hereinafter) in advance. That is, the concept "object route" may or may not be used.

A target image is decided, and an image sensing apparatus route adjacent to the target image is acquired, as described above. Next, n points at equal intervals on the image sensing apparatus route are sampled. Then, pieces of object position/time information which are locally and temporally close to n samples are acquired. Note that "locally close" means that a distance is equal to or smaller than a certain threshold, and "temporally close" means that a time is within a margin defined by certain thresholds. By the processes executed so far, n sets of pieces of object position/time information can be generated.

When pieces of position/time information of an identical object are included in the entire sets obtained in the previous process, it is determined that a similarity between the route of that object and the image sensing apparatus route is high. Note that such judgment may be made by checking not only whether or not pieces of information are included in the n entire sets but also a ratio of the number of pieces of information included in the entire sets. For example when n=10, if 80% (=8 sets) of 10 sets include information, it is determined that two routes are similar to each other. Also, the aforementioned thresholds may be set to be stricter (narrower) with decreasing distance to the target.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-117046 filed May 13, 2009, which is hereby incorporated by reference herein in its entirety.

What is claimed is:

1. An information processing apparatus comprising:
a first acquisition unit which acquires a plurality of pieces of position information of an image sensing apparatus at times adjacent to an imaging time of an image by the image sensing apparatus;
a second acquisition unit which acquires, for each of a plurality of moving objects, a plurality of pieces of position information of the moving object at the adjacent times;
a calculation unit which calculates, for each of the plurality of moving objects, a similarity between a route of the image sensing apparatus and a route of the moving object based on the plurality of pieces of position information of the image sensing apparatus and the plurality of pieces of position information of the moving object, wherein the similarity indicates a difference between the plurality of pieces of position information of the image sensing apparatus and the plurality of pieces of position information of the moving object, and the similarity is higher as the difference is smaller; and
a registration unit which registers, as metadata of the image, information used to specify the moving object for which the similarity is higher than a pre-set threshold even if the moving object for which the similarity is higher than the pre-set threshold is not included in the image, and
wherein the first acquisition unit, the second acquisition unit, the calculation unit and the registration unit are implemented by a processor.

2. The apparatus according to claim 1, further comprising:
a first management unit which manages a plurality of pieces of position information of the image sensing apparatus for respective times; and
a second management unit which manages a plurality of pieces of position information of the moving object for respective times,
wherein said first acquisition unit acquires the plurality of pieces of position information of the image sensing apparatus at the adjacent times to the imaging time of the image by the image sensing apparatus from the plurality of pieces of position information managed by said first management unit, and
said second acquisition unit acquires the plurality of pieces of position information of the moving object at the adjacent times from the plurality of pieces of position information managed by said second management unit.

3. The apparatus according to claim 2, wherein said first management unit manages position information of the image sensing apparatus at the imaging time by the image sensing apparatus.

4. The apparatus according to claim 2, wherein said first management unit manages pieces of position information of the image sensing apparatus, which are measured periodically.

5. The apparatus according to claim 1, wherein said calculation third acquisition unit acquires the similarity using an average value and a variance value of distances between the plurality of pieces of position information acquired by said first acquisition unit and the plurality of pieces of position information acquired by said second acquisition unit.

6. An information processing method implemented by a processor executing:
a first acquisition step of acquiring a plurality of pieces of position information of an image sensing apparatus at times adjacent to an imaging time of an image by the image sensing apparatus;
a second acquisition step of acquiring, for each of a plurality of moving objects, a plurality of pieces of position information of the moving object at the adjacent times;
a calculation step of calculating, for each of the plurality of moving objects, a similarity between a route of the image sensing apparatus and a route of the moving object based on the plurality of pieces of position information of the image sensing apparatus and the plurality of pieces of position information of the moving object, wherein the similarity indicates a difference between the plurality of pieces of position information of the image sensing apparatus and the plurality of pieces of position information of the moving object, and the similarity is higher as the difference is smaller; and a registration step of registering, as metadata of the image, information used to specify the moving object for which the similarity is higher than a pre-set threshold even if the moving object for which the similarity is higher than the pre-set threshold is not included in the image.

7. The apparatus according to claim 1, wherein said registration unit registers, in addition to the information used to specify the moving object for which the similarity is higher than the pre-set threshold, a degree of condition sharing, being based on closeness of the routes defined by the similarity, between a photographer of the image and the moving object for which the similarity is higher than the pre-set threshold, as the metadata of the image.

8. The apparatus according to claim 5, wherein said registration unit registers, as metadata of the image, information used to specify the moving object for which the variance is smaller than a pre-set threshold.

9. The apparatus according to claim 1, further comprising:
an accuracy calculation unit which calculates an accuracy when an object included in the image is recognized as the moving object; and
a correction unit which corrects the accuracy based on the similarity.

10. A non-transitory computer-readable storage medium storing a computer program for making a computer function as respective units included in an information processing apparatus according to claim 1.

* * * * *